United States Patent [19]

Barbehoen

[11] Patent Number: 5,909,722
[45] Date of Patent: Jun. 8, 1999

[54] METHOD AND DEVICE FOR CONTROLLING A FINAL CONTROLLING ELEMENT IN CLOSED-LOOP

[75] Inventor: Kai-Lars Barbehoen, Ludwigsburg, Germany

[73] Assignee: Robert Bosch GmbH, Stuttgart, Germany

[21] Appl. No.: 09/026,731

[22] Filed: Feb. 20, 1998

[30] Foreign Application Priority Data

Feb. 21, 1997 [DE] Germany .............................. 197 06 821

[51] Int. Cl.⁶ .................................................. F02D 31/00
[52] U.S. Cl. ............................................ 123/357; 123/502
[58] Field of Search .................................. 123/500, 501, 123/502, 357

[56] References Cited

U.S. PATENT DOCUMENTS

| | | |
|---|---|---|
| 4,727,303 | 2/1988 | Morse et al. ............................. 123/357 |
| 5,085,190 | 2/1992 | Birk et al. ............................... 123/357 |
| 5,178,111 | 1/1993 | Wietelmann et al. .................... 123/357 |
| 5,188,084 | 2/1993 | Sekiguchi ................................ 123/502 |
| 5,609,136 | 3/1997 | Tuken ..................................... 123/478 |
| 5,771,861 | 6/1998 | Musser et al. .......................... 123/357 |

FOREIGN PATENT DOCUMENTS

| | | |
|---|---|---|
| 0 050 168 | 4/1982 | European Pat. Off. . |
| 41 05 740 | 9/1991 | Germany . |
| 2 081 475 | 2/1982 | United Kingdom . |
| 2 115 950 | 9/1983 | United Kingdom . |
| WO 88/05933 | 8/1988 | WIPO . |

*Primary Examiner*—Thomas N. Moulis
*Attorney, Agent, or Firm*—Kenyon & Kenyon

[57] ABSTRACT

A method and a device for controlling in closed-loop a final controlling element having integral action, in particular an injection-timing device of a high-pressure fuel pump. On the basis of a system deviation, an automatic controller defines a driving signal to be fed to the final controlling element. The output signal from the automatic controller is acted upon by a precontrol, which can be so specified that the final controlling element remains in its position.

10 Claims, 2 Drawing Sheets

METHOD AND DEVICE FOR CONTROLLING A FINAL CONTROLLING ELEMENT IN CLOSED-LOOP

FIELD OF THE INVENTION

The present invention relates to a method and a device for controlling a final controlling element in closed-loop, in particular an injection-timing device of a high-pressure fuel pump.

BACKGROUND INFORMATION

A method and a device for controlling a final controlling element in closed-loop are described, for example, in German Patent No. DE 41 05 740 (U.S. Pat. No. 5,085,190). A method and a device are described therein for controlling a controlling element in closed loop to influence the start of injection of a high-pressure fuel pump.

On the basis of a system deviation, an automatic controller defines a driving signal to be fed to the final controlling element. The output signal from the automatic controller is superposed with an output signal from a precontrol (pilot control), the precontrol exhibiting a response characteristic that is the inverse of the response characteristic of the final controlling element. To be able to compensate for tolerances between individual final controlling elements and for manifestations of ageing in an ongoing operation, the driving signal of the final controlling element is adapted.

The design of the automatic controller is problematic, in particular when the final controlling element exhibits integral action. This means that even when no driving signal for the final controlling element is at hand, the variable to be adjusted changes. For this reason, even in the absence of a system deviation, it is necessary that the final controlling element receive a driving signal that will not produce a change in the variable to be adjusted.

Furthermore, it is problematic to optimize the requirements with respect to dynamic response and control precision. To be able to achieve a closed-loop control with a good dynamic response, the automatic controller should essentially exhibit only a PD (proportional-plus-derivative) action. An integral-action component leads to degradation of the dynamic response. However, this integral-action component does improve the control precision.

SUMMARY OF THE INVENTION

An object of the present invention is to provide a method and a device for controlling a final controlling element in closed loop, achieving a best possible control response. In particular, the automatic controller should be able to react quickly to variations in the setpoint value, it being important at the same time that no lasting system deviation occur.

The method according to the present invention makes it possible to use a dynamically well designed automatic controller, at the same time without any lasting system deviation occurring.

DETAILED DESCRIPTION

Figure 1:
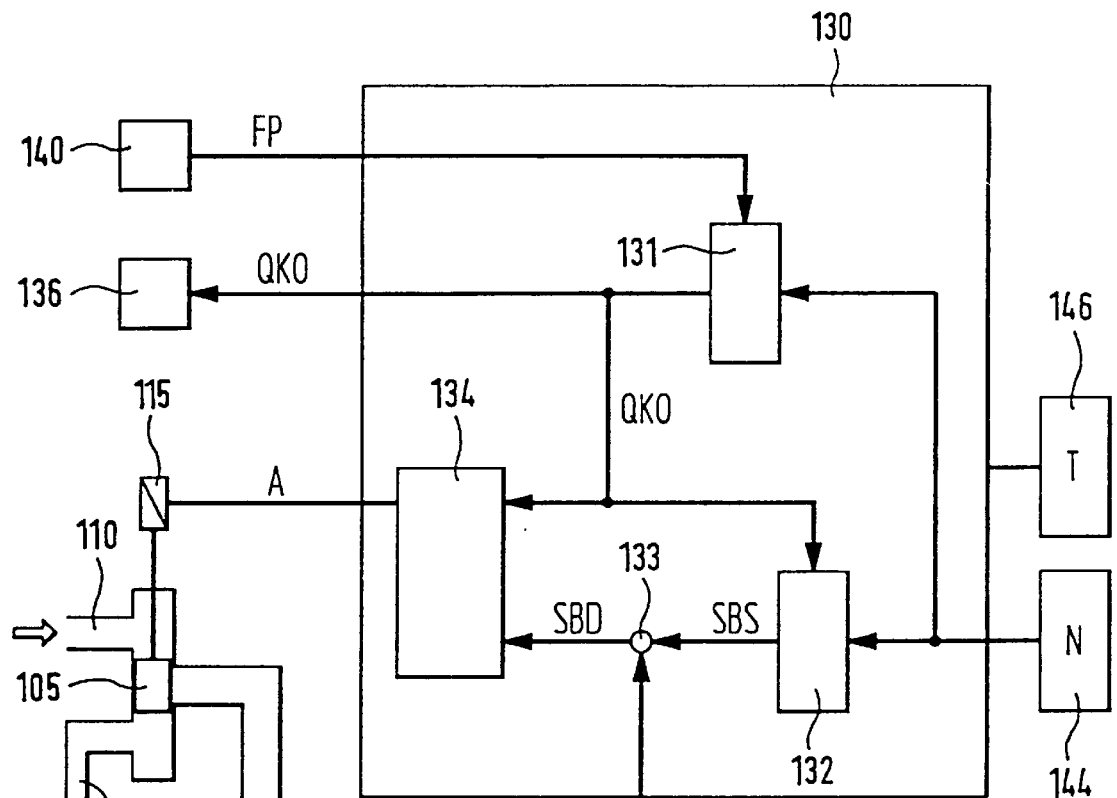
FIG. 1 shows a functional block diagram of the device of the present invention.

FIG. 1 schematically depicts the device of the present invention on the basis of a block diagram. 100 denotes a timing device. Timing devices of this kind are usually used for adjusting the start of pump delivery and/or the delivery rate when working with distributor injection pumps.

The timing device comprises an actuating arm 160, which engages with a so-called roller ring of the distributor injection pump. The actuating arm is coupled to a timing-device plunger 155. Timing-device plunger 155 is supported in a guide cylinder 150 and, there, with its one front end, seals off a spring cavity 162 and, with its other end, a working chamber 107. Arranged in spring cavity 162 is a restoring spring 165 braced between timing-device plunger 155 and guide cylinder 150.

A slide valve 105 can be adjusted by means of a solenoid 115. Depending on the position of slide valve 105, hydraulic fluid from an intake line 110 can arrive in the working chamber, or from working chamber 107 into a return flow line 120.

The start of delivery can be adjusted by displacing timing-device plunger 155, as well as actuating arm 160. If the intention is to "advance" the start of delivery, provision can be made, for example, for the timing-device plunger to be displaced downwards. This is achieved in that solenoid 115 is driven so as to release the connection between the intake line and working chamber 107. This causes timing-device plunger 155 to be pressurized, the spring to be compressed, and the plunger to move downwards.

If the intention is to "retard" the start of delivery as a function of the prevailing operating conditions, solenoid 115 is driven so as to release the connection between return flow line 120 and working chamber 107. This relieves pressure from timing-device plunger 155, causing it to move upwards because of the spring resilience, thus "retarding" the start of delivery.

Control unit 130 feeds driving signals to solenoid 115. In addition, control unit 130 feeds driving signals QKO to other controlling means 136, such as to a volume-flow control unit. Control unit 130 processes various output signals from different sensors. It is a question here, for example, of means 140 for specifying a driver's command signal FP, a sensor 142 for detecting an actual value SBI, defining the actual start of injection and/or the actual position of the timing device, a sensor 144 for detecting a speed signal N, and/or a sensor 146 for detecting a temperature value T.

In addition to other elements, control unit 130 comprises a fuel-quantity setpoint selection 131, which, in addition to other variables not described here, is supplied with the driver's command signal FP and speed N. Fuel-quantity setpoint selection makes available a fuel-quantity signal QKO. This signal QKO is fed to volume-flow controlling unit 136.

Provision is also made for a setpoint selection unit 132, which, in addition to other variables not shown here, is supplied with fuel-quantity signal QKO and speed N. Setpoint selection unit 132 makes available a setpoint value SBS for controlling the timing device in closed loop.

Setpoint value SBS and an actual value SBI are gated together in a node 133. The output of node 133 acts upon a timing-device control 134, which, in addition, can be supplied with fuel-quantity signals QKO. Timing-device control 134 feeds driving signals to solenoid 115.

On the basis of operating parameters, such as at least fuel-quantity signal QKO and speed signal N, setpoint-selection unit 132 calculates setpoint value SBS. This setpoint value is compared in node 133 to actual value SBI, and system deviation SBD is formed. On the basis of this system deviation SBD, timing-device control 134 drives solenoid 115.

Timing device 100 exhibits integral action. This means that if solenoid 115 receives a certain signal, then this does not lead to a defined position of actuating arm 160. A defined driving signal for coil 115 results in a defined inflow of pressurized media into working chamber 107 or in a defined outflow therefrom. As a rule, this effects a continuous displacement of pump plunger 155 or of actuating arm 160.

To retain plunger 155 in its position, it is necessary for solenoid 115 to receive a specific driving signal. Solely in the case of a system deviation is a driving signal to be selected which effects an inflow or outflow of pressurized media.

Figure 2:
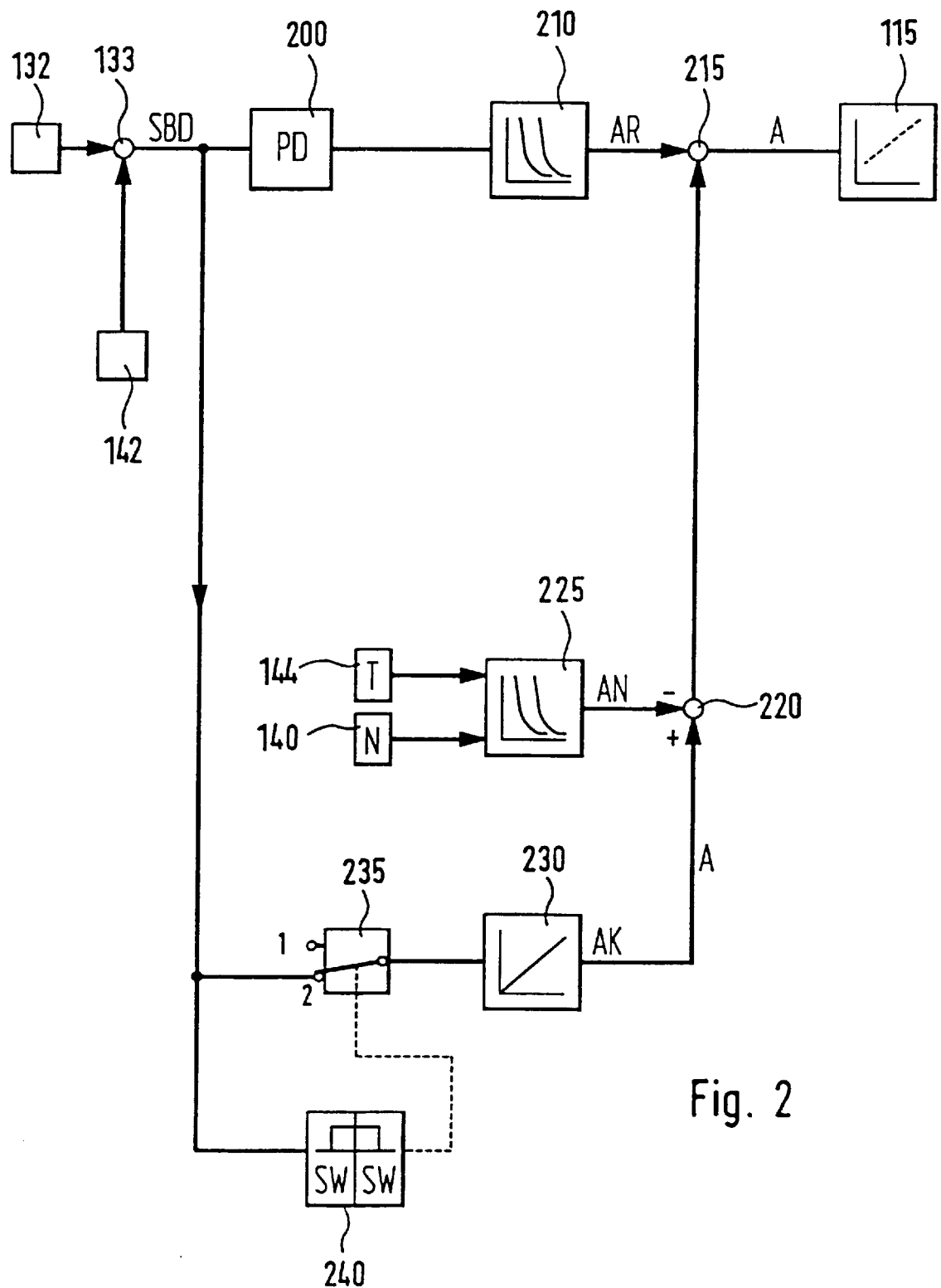
FIG. 2 shows a functional block diagram of the closed-loop control structure of the present invention.

A special automatic controller 134 is required for this purpose. A specific embodiment of such an automatic controller is shown in greater detail in FIG. 2. Elements already depicted in FIG. 1 are depicted with corresponding reference numerals in FIG. 2.

System deviation SBD is fed to an automatic controller 200, to the second input of a switching element 235, and to a driving unit 240. Automatic controller 200 supplies a driving characteristics field 210 with a signal. Via a node 215, output signal AR of driving characteristics field 210 attains final controlling element 100.

Switching element 235 connects an I-(integral-action) component 230 optionally to its first input or to its second input, where system deviation SBD is applied. Switching element 235 is driven by driving unit 240 as a function of system deviation SBD. Output signal AK of I-component 230 is fed to a node 220, whose output signal, in turn, arrives at the second input of node 215. Signal AN of a zero value characteristics field is applied to the second input of node 220. The output signals of various sensors 146 and 144 are supplied to the zero value characteristics field.

Automatic controller 200 preferably exhibits PD action. This means it has a proportional and a derivative-action component. As a function of system deviation SBD, the automatic controller defines a driving signal, which is converted in driving characteristics field 210 into a pulse duty factor AR to be received by solenoid 115. Automatic controller 200 is preferably engineered to have a suitable dynamic response, i.e., a rapid response to variations in the setpoint value.

Automatic controller 200 can also be so conceived that its closed-loop control parameters vary in different operating modes. Thus, provision can be made for the response characteristic of the automatic controller to vary as a finction of the amount of the system deviation.

On the basis of temperature T and speed N of the internal combustion engine, zero-value characteristics field 225 specifies a driving signal AN, at which pump plunger 155 remains in its present position, i.e., element 105 blocks both the inflow and the return flow.

Different driving signals are produced in response to various variations in operating conditions due to hydraulic and other forces. In accordance with the present invention, value AN is stored as a function of various operating parameters in characteristics map 225. The important variables that enter into this are speed N and temperature T.

Output signal AN from the zero-value characteristics field is fed via node 220 to node 215, where it is preferably cumulatively superimposed upon output signal AR of the driving characteristics map 210. The effect of this precontrol is that solenoid 115, given a system deviation of nearly zero, i.e., automatic controller 210 does not supply any output signal, is so driven that plunger 155 remains in its momentary position and merely changes its position in response to residual system deviations.

Figure 3:
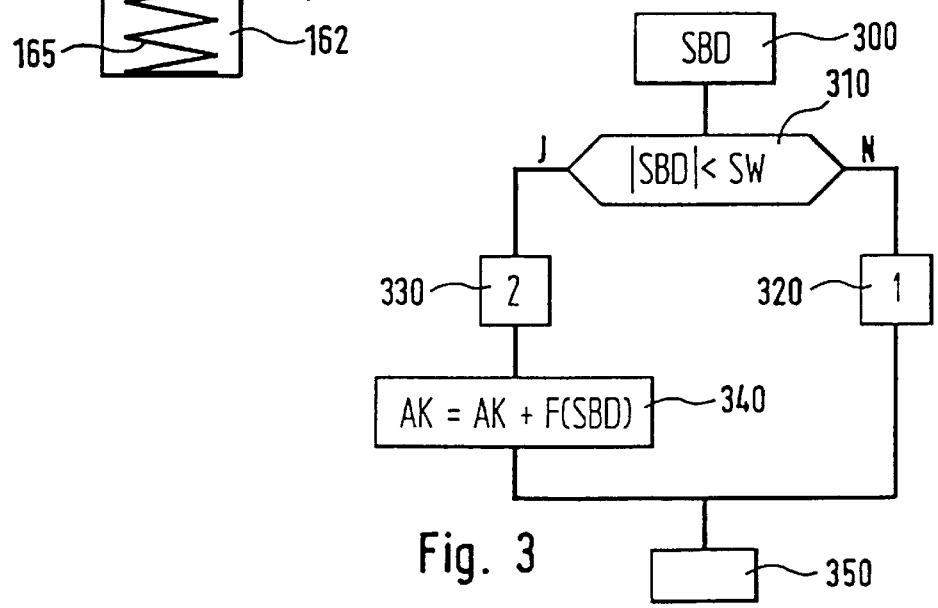
FIG. 3 shows a flow chart illustrating the method of the present invention.

Because of tolerances, signal AN is not able to hold ready the exact value for every working point. To compensate for such errors and for manifestations of age, provision is made for a correction value AK to be learned, signal AN being superposed with this correction value AK in node 220. The procedure for holding ready correction value AK is illustrated in FIG. 3 on the basis of a flow chart.

System deviation SBD is formed in a first step 300. A query 310 checks whether the amount of system deviation SBD is smaller than a threshold value. If this is not the case, switching element 235 is driven to assume its first position. If amount SBD is smaller than threshold value SW, then switching element 235 is driven in step 330 to assume its second position. In this case, the system deviation is fed to I-component 230. I-component 230 exhibits integral action. On the basis of system deviation SBD, it forms correcting quantity AK. Output signal AN of the zero-value characteristics map is superposed with correcting quantity AK in node 220. This means that in step 240, value AK is determined by means of summing, starting out from old value AK and a value defined by system deviation SBD as a function F. This means that, in each case, a value that is a function of the system deviation is added to value AK. This represents the simplest realization of an integral action. Step 340 and 320 are followed by step 350, in which the normal program run is executed.

In operating states where a small system deviation occurs, switching element 235 is forced into position 2 by driving unit 240, and correction value AK is determined. In other operating states where the system deviation is greater than threshold value SW, switching element 235 is in position 1. If switching element 235 is in its first position 1, no signal is fed to I-component 230; this means output signal AK remains at its current (active) value. In these operating states, correction value AK, determined earlier, is used to correct the precontrol value.

In accordance with the present invention, in certain operating states, a correction value is specified for correcting the precontrol value as a function of the system deviation. The decision as to whether the correction values are determined is made as a function of the system deviation. In addition, I-component 230 determines the correction values at least as a function of the system deviation.

One especially advantageous refinement of the present invention provides for the output signal of I-component 230 to be used to correct the zero-value characteristics map 225. To this end, for example, as a function of the output signal of I-component 230, a correction value is added to all characteristic map values of zero-value characteristics map 225 and/or all values are multiplied by a multiplication factor.

Provision is made in accordance with the present invention for zero characteristics map 225, which acts as a precontrol, to emit a signal with the effect that the manipulated variable remains at the adjusted value. Automatic controller 200 is so designed that, in response to a change in setpoint value SBS, the manipulated variable rapidly assumes its new value. Due to a suitable design and the PD action of automatic controller 200, a good dynamic response of the closed-loop control circuit is achieved. The automatic controller responds very quickly to changes in the setpoint value. The control accuracy is improved by I-component 230. Tolerances and errors are likewise compensated for by I-component 230. This means that precontrol value AN, which is specified by zero characteristics map 225 on the basis of various operating parameters, is adapted as a function of correction value AK, which is held ready by the I-component.

What is claimed is:

1. A method for controlling in closed-loop a final controlling element having integral action as a function of a system deviation, comprising the steps of:
   providing a driving signal to be fed to the final controlling element using an automatic controller; and
   influencing the driving signal as a function of a precontrol value such that a position of the final controlling element is maintained when the system deviation is approximately equal to zero.

2. The method according to claim 1, wherein the final controlling element includes an injection-timing device of a high-pressure fuel pump.

3. The method according to claim 1, further comprising the step of presetting a correction value for correcting the precontrol value as a function of the system deviation, in at least one operating state.

4. The method according to claim 3, wherein the correction value is determined when an amount of the system deviation is smaller than a threshold value.

5. The method according to claim 1, wherein the influencing step includes the step of storing the precontrol value as a function of at least one operating parameter in a characteristics map.

6. The method according to claim 3, further comprising the step of adapting the precontrol value as a function of the correction value.

7. The method according to claim 1, wherein the automatic controller exhibits PD action.

8. A device for controlling in closed-loop a final controlling element having integral action as a function of a system deviation, comprising:
   an automatic controller defining a driving signal to be fed to the final controlling element; and
   a precontrol unit applying a precontrol value to the driving signal such that a position of the final controlling element is maintained when the system deviation is approximately equal to zero.

9. The device according to claim 8, wherein the final controlling element includes an injection-timing device of a high-pressure fuel pump.

10. The device according to claim 8, further comprising means for specifying, in at least one operating state, a correction value as a function of the system deviation for correcting the precontrol value, the means for specifying having integral action.

* * * * *